No. 748,774. PATENTED JAN. 5, 1904.
W. B. McKINLEY.
PLOW OR CULTIVATOR.
APPLICATION FILED FEB. 19, 1903.
NO MODEL.
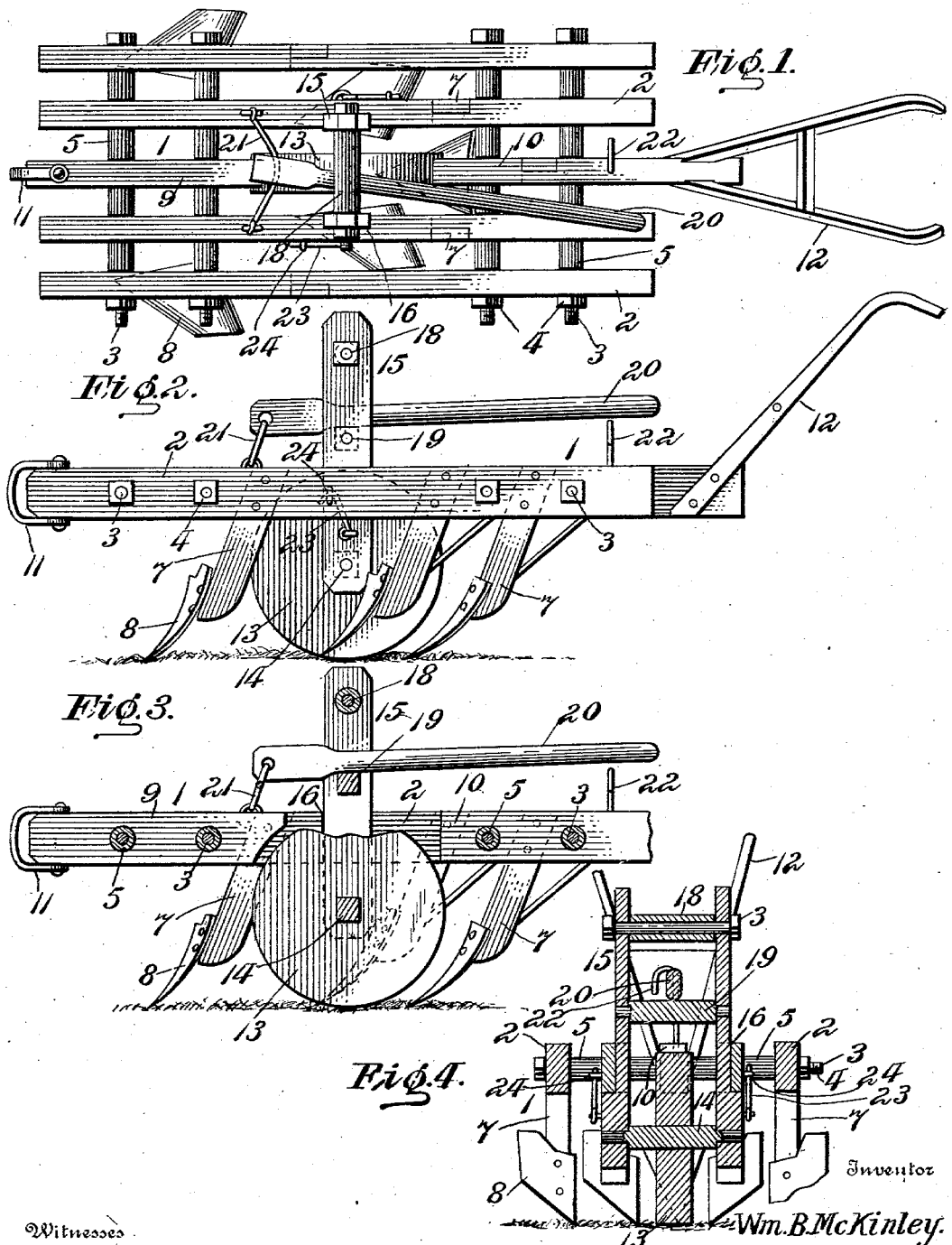
Witnesses
Guy V. Worthington
J. B. Wilson
Inventor
Wm. B. McKinley.
By H. B. Wilson
Attorney No. 748,774. Patented January 5, 1904.

UNITED STATES PATENT OFFICE.

WILLIAM B. McKINLEY, OF PRICHARD, ALABAMA.

PLOW OR CULTIVATOR.

SPECIFICATION forming part of Letters Patent No. 748,774, dated January 5, 1904.

Application filed February 19, 1903. Serial No. 144,139. (No model.)

*To all whom it may concern:*

Be it known that I, WILLIAM B. MCKINLEY, a citizen of the United States, residing at Prichard, in the county of Mobile and State of Alabama, have invented certain new and useful Improvements in Plows or Cultivators; and I do declare the following to be a full, clear, and exact description of the invention, such as will enable others skilled in the art to which it appertains to make and use the same.

This invention relates to plows or cultivators; and its object is to provide a device of this character so constructed as to permit of the use of a plurality of plowshares or cultivators at will and wherein the plowshares or shovels may be simultaneously lifted above the ground-surface for ease of operation in turning curves and to enable the device to be conveniently hauled from place to place.

With this object in view the invention consists in certain novel features of construction, combination, and arrangement of parts, which will be hereinafter more fully described, and particularly defined in the appended claims.

In the accompanying drawings, Figure 1 is a top plan view of a plow or cultivator embodying my invention. Fig. 2 is a side elevation of the same. Fig. 3 is a longitudinal section, and Fig. 4 is a cross-section.

Referring now more particularly to the drawings, the numeral 1 represents the frame of my improved plow or cultivator, which comprises in its construction a series of longitudinal bars 2, connected together by transverse tie-bolts 3, provided with clamping-nuts 4. On these bolts between the bars are spacing-sleeves 5, which hold the bars spaced the required distance apart. By this construction any desired width of frame may be employed by varying the number of bars, so that any required number of plowshares or cultivator-shovels may be supported therefrom. The bars carry standards 7, to which are secured the plowshares or cultivator-shovels 8.

The intermediate bar of the supporting-frame consists of two divided sections 9 and 10, the front section 9 being provided with a clevis or draft attachment 11, to which a draft appliance for one or more horses may be attached, and the rear section carries the stilts or handles 12.

The ground-wheel 13 is mounted in the space between the sections 9 and 10 of the central bar and is carried by a shaft 14, journaled in the side arm of a vertical frame 15, which is fitted in guide-groove 16, formed in the intermediate bars of the frame, and on this wheel-supporting frame the frame 1 is vertically adjustable, so as to permit the plowshares or shovels to be lowered for work or raised out of contact with the ground. The wheel-carrying frame is provided with two cross-bars 18 19, between which plays a lever 20, which is connected at its front end to a swinging bail 21, attached to the intermediate longitudinal bars, and the free end of this lever projects rearwardly and is adapted when forced down to be engaged by a catch 22, mounted upon the rear section 10 of the central bar.

In order to hold the wheel-supporting frame in working position, I provide the said frame with pivoted hooks or catches 23, adapted to engage staples 24 on the intermediate longitudinal bars of the frame 1. When these catches are engaged with the staples, the frame 1 is held in working position, so that the plowshares or cultivator-shovels will enter the ground to the required depth. By detaching the catches and depressing the lever 20, so as to rock upon the bar 19, which serves as a fulcrum-bar, and engaging said lever with the catch 22 the frame 1 is elevated to lift the plowshares or cultivator-shovels above the surface of the ground and locked in elevated position to enable the implement to be easily drawn in turning curves and conveniently hauled from place to place.

From the foregoing description, taken in connection with the accompanying drawings, the construction, mode of operation, and advantages of the invention will be readily apparent, it is thought, without requiring a more extended explanation.

Various changes in the form, proportion, and the minor details of construction may be resorted to without departing from the principle or sacrificing any of the advantages of this invention.

Having thus described my invention, what I claim as new, and desire to protect by Letters Patent, is—

1. In an agricultural implement, the combination of a supporting-frame composed of spaced bars, the central bar being formed of spaced sections, a wheel-carrying frame disposed in the space between said sections of the central bar and having a sliding engagement with the next adjacent frame-bars, said frame comprising standards, a lower transverse shaft, an upper transverse connecting-brace and an intermediate fulcrum-bar, a ground-wheel mounted on said shaft, a lever extending through the wheel-carrying frame between the brace and fulcrum-bar and fulcrumed at its forward end to the supporting-frame in advance of the wheel-carrying frame and projecting rearwardly of the latter-named frame, said lever adapted when disposed to rock upon said fulcrum-bar to elevate the supporting-frame, coacting catches on the supporting-frame and wheel-carrying frame for holding said supporting-frame in elevated position, and a catch upon the supporting-frame to engage the rear end of the lever to hold said lever depressed when the said coacting catches are in engagement.

2. In an agricultural implement, the combination of a supporting-frame composed of spaced bars, the central bar being formed of spaced sections, a wheel-carrying frame disposed in the space between said sections of the central bar and having a sliding engagement with the next adjacent frame-bars, said frame being provided with a shaft and a fulcrum-bar, a ground-wheel mounted on said shaft, a lever fulcrumed to the supporting-frame and front of the wheel-carrying frame and projecting rearwardly through the latter-named frame, said lever adapted when depressed to rock upon said fulcrum-bar to elevate the supporting-frame, coacting catches on the supporting and wheel-carrying frames for holding said supporting-frame in an elevated position, and a catch upon the supporting-frame to engage the rear end of the lever to hold said lever depressed when the said coacting catches are in engagement, substantially as described.

In testimony whereof I have hereunto set my hand in presence of two subscribing witnesses.

WILLIAM B. McKINLEY.

Witnesses:
E. B. CHUNN,
PALMER PILLANS.